United States Patent [19]
Skidmore

[11] 3,905,648
[45] Sept. 16, 1975

[54] WHEEL BALANCING WEIGHT AND COMBINATION THEREOF

[75] Inventor: Frank Oren Skidmore, Cuyahoga Falls, Ohio

[73] Assignee: Ann Gottwald, Akron, Ohio

[22] Filed: Aug. 5, 1974

[21] Appl. No.: 494,606

[52] U.S. Cl. .................................. 301/5 B; 301/5 R
[51] Int. Cl.² ..................... B60B 1/00; B60B 27/00
[58] Field of Search ............................ 301/5 B

[56] References Cited
UNITED STATES PATENTS
3,273,941  9/1966  Skidmore........................... 301/5 B

*Primary Examiner*—M. Henson Wood, Jr.
*Assistant Examiner*—D. W. Keen
*Attorney, Agent, or Firm*—Oldham & Oldham Co.

[57] ABSTRACT

The invention relates to an extruded lead wheel balancing weight for use with pneumatic tires, particularly for automobiles, and particularly for a rim having a tapered wheel seating flange. The weight is tapered across its width so as to take a conical shape along one surface when the weight is formed to the circular configuration of the wheel flange to thereby conform to the tapered shape of the wheel flange and remain parallel to the rotating axis of the wheel. The weight is normally extruded and moldable by finger pressure, and is held in place to the wheel flange by a double faced pressure sensitive adhesive foam.

7 Claims, 4 Drawing Figures

3,905,648

WHEEL BALANCING WEIGHT AND COMBINATION THEREOF

With the advent of newer wide tread tires, the industry for pneumatic automobile tires has found that wider rims are necessary, thereby creating greater problems in the balance of such tires. Further, with the advent of the wider rims, and the use of disk brakes, a problem is created in space of the disk brakes with respect to the rims, and particularly those portions of the rim extending parallel to the rotating axis of the wheel. Hence, tire and rim designers have continued to utilize the drop center well approach with tapered flanges extending outwardly and towards greater diameter from the drop center well so as to accommodate the disk brake spacing requirements. It has also been found that the drop center well is positioned closer to the outboard flange than it is to the inboard flange and that the inboard flange is then tapered at a more pronounced angle than the outboard flange.

During the past few years, it has become more popular to utilize a pressure sensitive adhesive applied extruded lead weight for balancing, such as that taught in my prior United States Patents because the better balance is achieved, and the weight can be positioned back underneath the backside of the rim or underneath the hub cap so as to not cause the sightly appearance of the conventional clip on weights. However, a problem develops in applying the kind of weight taught by my prior patents to a wheel rim having a tapered or conically shaped flange because the normal square extruded shape will not lie concentric with the rotating axis of the wheel because when it is bent to configuration, it does not assume the same conical shape as the flange to which it is applied. This further interferes when utilized on the inboard flange with the disk brake coming into contact with the wheel weight and stripping the weight from the wheel, or causing damage to the disk brake assembly.

Therefore, it is the general object of the present invention to avoid the problems inherent with tapered rims when utilizing a pressure sensitive adhesive applied wheel balancing weight by forming the weight to comply with the conical configuration of the flange to which it is applied.

A further object of the invention is to provide a wheel balancing weight which might be extruded, is inexpensive, and may be molded by finger pressure, and which readily conforms to the conical configuration of the flange surface of the rim to which it is applied.

The aforesaid objects of the invention and other objects which will become apparent are achieved in a balancing weight in combination with a rotatable pneumatic wheel which comprises an elongated lead based strip weight having a trapezoidal shape in cross-section with two long non-parallel sides and two substantially parallel ends, one end being shorter than the other, a drop center rim mounting a pneumatic tire to constitute the wheel, said rim having a tire supporting flange attached to the drop center and bead retaining edges on the flange to mount the tire and where the flange is conical in shape tapering outwardly from the drop center rim, and means to secure the strip in position to a radially inward surface of the flange with the shorter end adjacent and substantially perpendicular to the drop center.

For a better understanding of the invention reference should be made to the accompanying drawings wherein.

Figure 2:
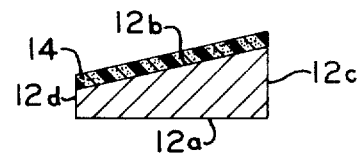
FIG. 2 is an enlarged cross-sectional view of the weight of FIG. 1 taken on line 2—2 thereof.

With reference to the embodiment of the invention illustrated in the drawings, the numeral 10 indicates generally a lead wheel weight comprising an extruded lead body portion 12 and a double faced pressure sensitive foam adherence portion 14. The body portion 12 is extruded to define a trapezoidal shape as illustrated in FIG. 2 which comprises two non-parallel sides 12$a$ and 12$b$, and two parallel ends 12$c$ and 12$d$, respectively. In FIG. 2 the pressure sensitive foam is attached to surface 12$b$.

Figure 1:
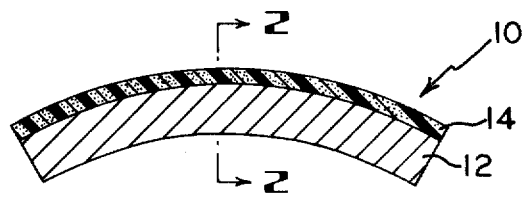
FIG. 1 is an enlarged cross-sectional edge view of the new weight which solves the objects of the invention.

I have found that the dimensions on the extrusion in the cross-sectional configuration shown in FIG. 2 can vary dependent on the desired amount of weight per lineal inch needed to effect balancing of particular tires being utilized with say between 0.5 to 1.5 ounces per lineal inch being normally suitable. I have found further that preferably the side 12$a$ is in perpendicular relationship with the ends 12$c$ and 12$d$ while the side 12$b$ is actually angled to both ends 12$c$ and 12$d$ so that the angle normally will coincide with the general angle of the tapered flange in the new rim design currently being utilized primarily for wide tread tires. I will explain this in more detail hereinbelow. In any event, the tapered configuration of the weight shown in cross-section in FIG. 2 when extruded from a soft lead which allows it to be moldable along its length to the curved configuration shown in FIG. 1 actually causes the surface 12$b$ to take a conical section configuration. If one were to have a long enough length of extruded weight 10 so as to bend one end around to touch the other, the surface 12$b$ would actually take a fully conical configuration.

COORDINATION OF WEIGHT WITH RIM

Figure 3:
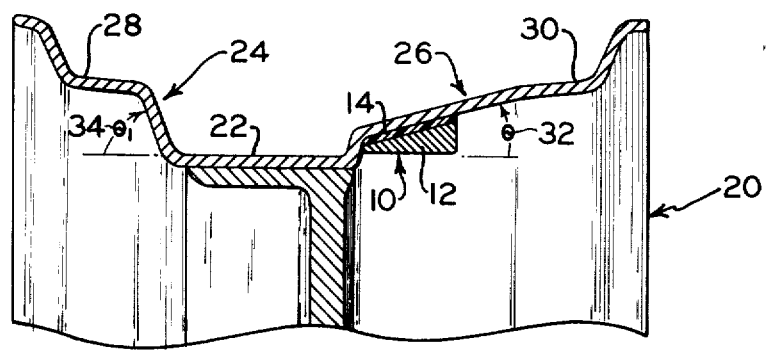
FIG. 3 is an enlarged cross-sectional view of the rim flange and drop center illustrating the weight of FIG. 2 in its attached position to the inboard tapered conical flange of the rim.

The new rim design currently most popular with respect to wide tread tires and disk brake designs is illustrated in cross-sectional configuration in FIG. 3. Here the rim indicated generally by numeral 20 comprises a drop center well portion 22, an outwardly extending outboard flange 24, and inwardly extending inboard flange 26, and bead retaining seats 28 and 30, respectively associated with the flanges 24 and 26, all of which is well understood by one skilled in the art. It should be noted in this configuration that the drop center well 22 is actually located in closer distance to the outboard side of the tire or flange 24 than it is to the inboard side of the tire or flange 26, this to allow for the room needed by the disk brake configuration now associated with most United States and foreign automobiles. Further, this type of rim design has the inboard flange 26 at an outwardly divergent angle theto $\theta$ indicated by numeral 32 from the horizontal or a line parallel to the rotating axis of the wheel. The outboard flange 24 is also tapered as shown by angle theto $\theta_1$ indicated by numeral 34, but to a much greater angular extent than the inboard flange 26.

The essence of the invention then is that the flange 26 in its full circular configuration on the wheel actually forms a conical shape. The normal square extruded lead taught by my prior United States Patents identified above simply does not provide the snug nesting configuration illustrated in FIG. 3 with the drop center 22 because when that weight is formed by finger pressure to the contour of the wheel, such as the curved configuration of weight 10 in FIG. 1, a conical shape is not provided by the surface carrying the double faced pressure sensitive adhesive foam, and the weight will not conform to the radially inner surface of flange 26.

Figure 4:
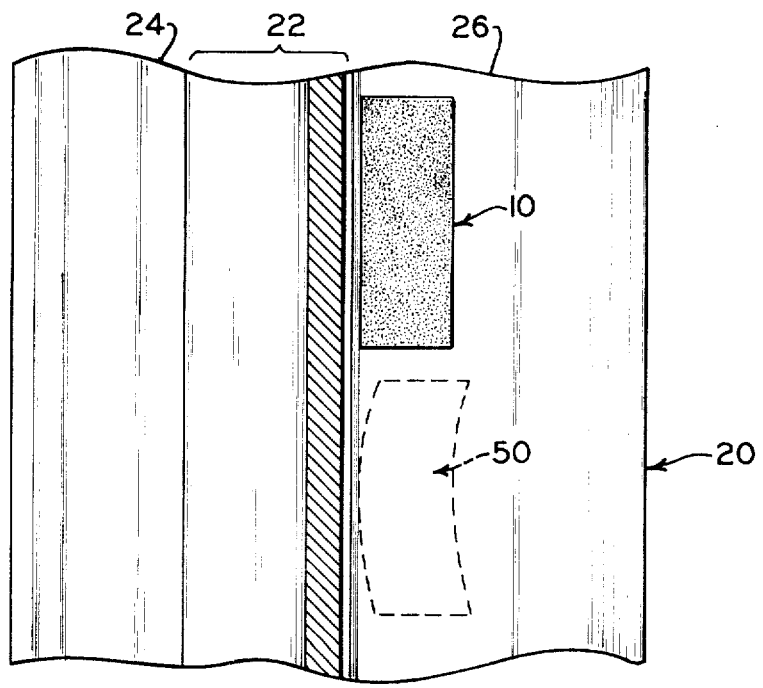
FIG. 4 is a plan view of the rim of FIG. 3 with the weight in position thereon.

Hence the tapered configuration of the weight shown in FIG. 2 when formed to the curvature of the flange 26 actually then creates a conical shape on surface 12b and fits snugly against the radially inner surface of flange 26 and the edge 12d likewise fits flush up against the outboard somewhat vertical surface of drop center well 22, all as shown in FIGS. 3 and 4. Now, looking at FIG. 4, in dotted chain outline the position of one of my weights shown in my above-identified patents as it would lie is illustrated by dotted chain line 50. It is quite evident that this weight will not conform along its inner edge to the vertical side of the drop center well 22.

Hence, it should be understood that the invention teaches a weight tapered in cross-section so that one surface thereof when the entire weight is curved along its lengths to the inner circumference of the rim will in fact fit to the slanted wheel rim. The weight is thereby positioned circumstantial to the alignment of the tire-wheel assembly, and will not create any dynamic unbalance condition as is the case with my old weight which would take the position illustrated by chain dotted line in FIG. 4. Hence, the new tapered weight taught by the invention is the same distance laterally from the center of mass of the wheel and creates an even distribution of radial thrust so as to eliminate lateral vibrations. The heavy edge of the weight is always towards the outboard of the wheel. I have found that a typical angled configuration between the non-parallel sides 12a and 12b is between about 5° to 25°, and that this will then compensate for the conical shape of the flange of this type of wheel. This type of weight thereby eliminates the extra machining operation currently being utilized by the Ford Motor Company and American Motors to achieve a flat non-conical area on this type of tapered rim. Further, this type of weight taught by my new invention fits snugly to the drop center to achieve the desired disk brake clearance so that the weight will not be wiped off by the disk brake nor cause any damage to the disk brake itself.

While my prior U.S. Pat. No. 3,273,941 teaches the idea of a magnetic test weight, it has also been my experience that the magnetic weight will not work with an alloy wheel or one that doesn't contain steel therein. Therefore, I propose as an additional feature of this invention to provide a tapered test balance weight which incorporates a magnetic flexible strip on one surface thereof, and a flexible multi-suction cup design on the other surface thereof. The suction cup configuration will include multiple suction cups of preferably small adjacent relationship with this surface being adapted to readily press into position on the alloy wheel of aluminum or magnesium, while the magnetic side can readily press into position on the steel rim and be held by the magnetic force. This combined test weight would be sold to those tire shops etc utilizing this type of flexible extruded lead strips for balancing, and would be designed to have substantially the same weight per unit length as the lead strips utilized for the final balance. The use of the test weight, of course, then accurately determines the amount and position of permanent adhesively applied lead weights necessary to achieve the desired balancing configuration for the wheel combination.

In accordance with the Patent Statutes, only the preferred embodiment of the invention has been illustrated and described herein, but it should be understood that the invention is not limited thereto or thereby, but is defined by the appended claims.

What is claimed is:

1. A balancing weight in combination with a rotatable pneumatic wheel which comprises:
   an elongated lead based strip weight having a trapezoidal shape in cross-section with two long non-parallel sides and two substantially parallel ends, one end being shorter than the other,
   a drop center rim mounting a pneumatic tire to constitute the wheel, said rim having a tire supporting flange attached to the drop center and bead retaining edges on the flange to mount the tire and where the flange is conical in shape tapering outwardly from the drop center rim, and
   means to secure the strip in position to radially inward surface of the flange with the shorter end adjacent and substantially parallel to the drop center.

2. A combination according to claim 1 wherein the strip weight is extruded and is moldable by finger pressure.

3. A combination according to claim 2 where the means to secure is pressure sensitive adhesive covering the full engaging surface of the strip weight to the flange.

4. A combination according to claim 3 where the trapezoidal shape of weight in cross-section is such that when the weight is conformed to the conical shape of the flange, the weight takes the shape of a segment of the cone, and the sides remain parallel to each other throughout the length of the weight.

5. A wheel balancing weight extruded from finger pressure moldable lead which has a trapezoidal shape in cross-section with two long non-parallel sides, and two short parallel sides, and double faced pressure sensitive foam means secured over the entire surface of one of the sides defined by one of the nonparallel sides.

6. A weight according to claim 5 where the other of the non-parallel sides is perpendicular to the parallel sides.

7. A weight according to claim 6 where when the weight is formed to a curved configuration whereby the other side is concave and the one side is convex, the one side forms the shape of a section of a cone.

* * * * *